J. W. TOBIN.
VEHICLE SIGNALING APPARATUS.
APPLICATION FILED SEPT. 21, 1909.
1,059,012.
Patented Apr. 15, 1913.
3 SHEETS—SHEET 1.
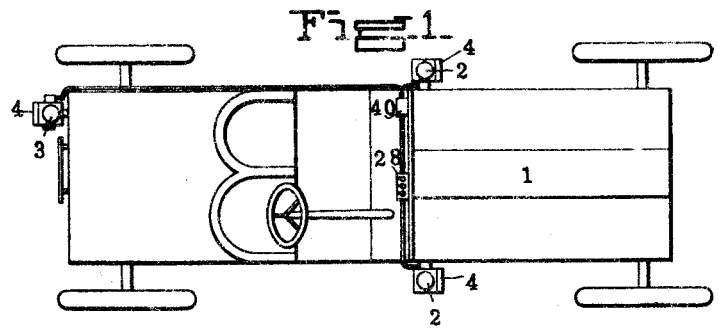
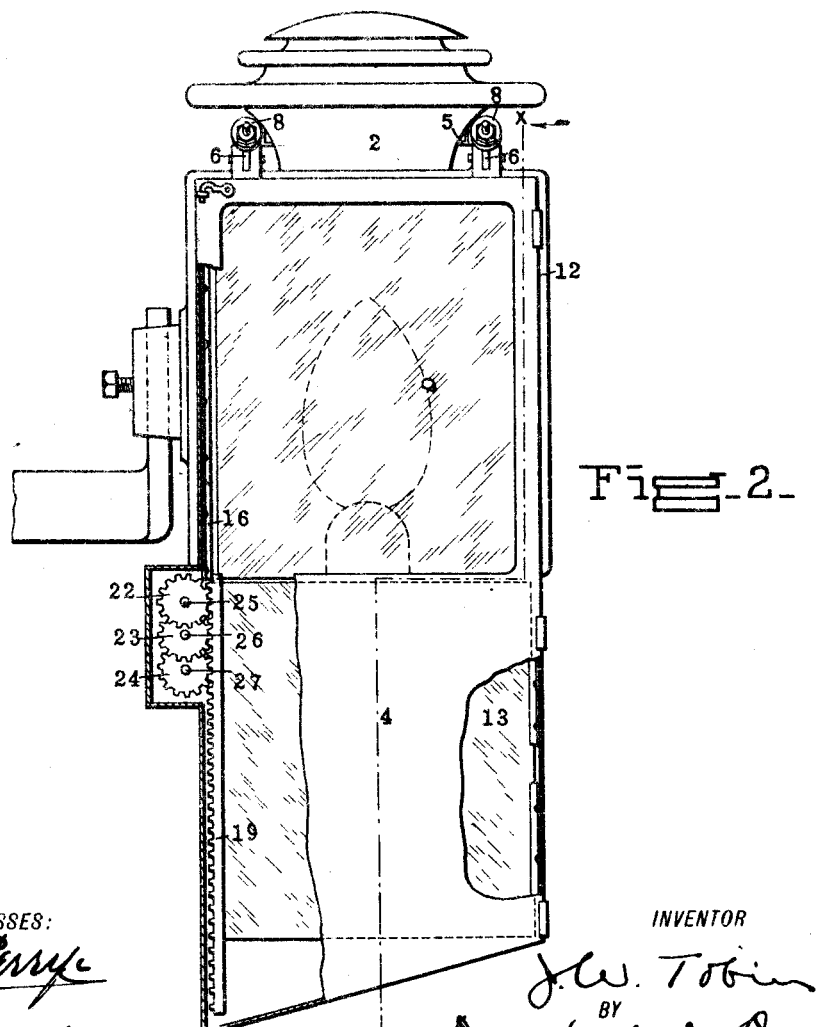
WITNESSES:
INVENTOR
J. W. Tobin
BY
ATTORNEYS.

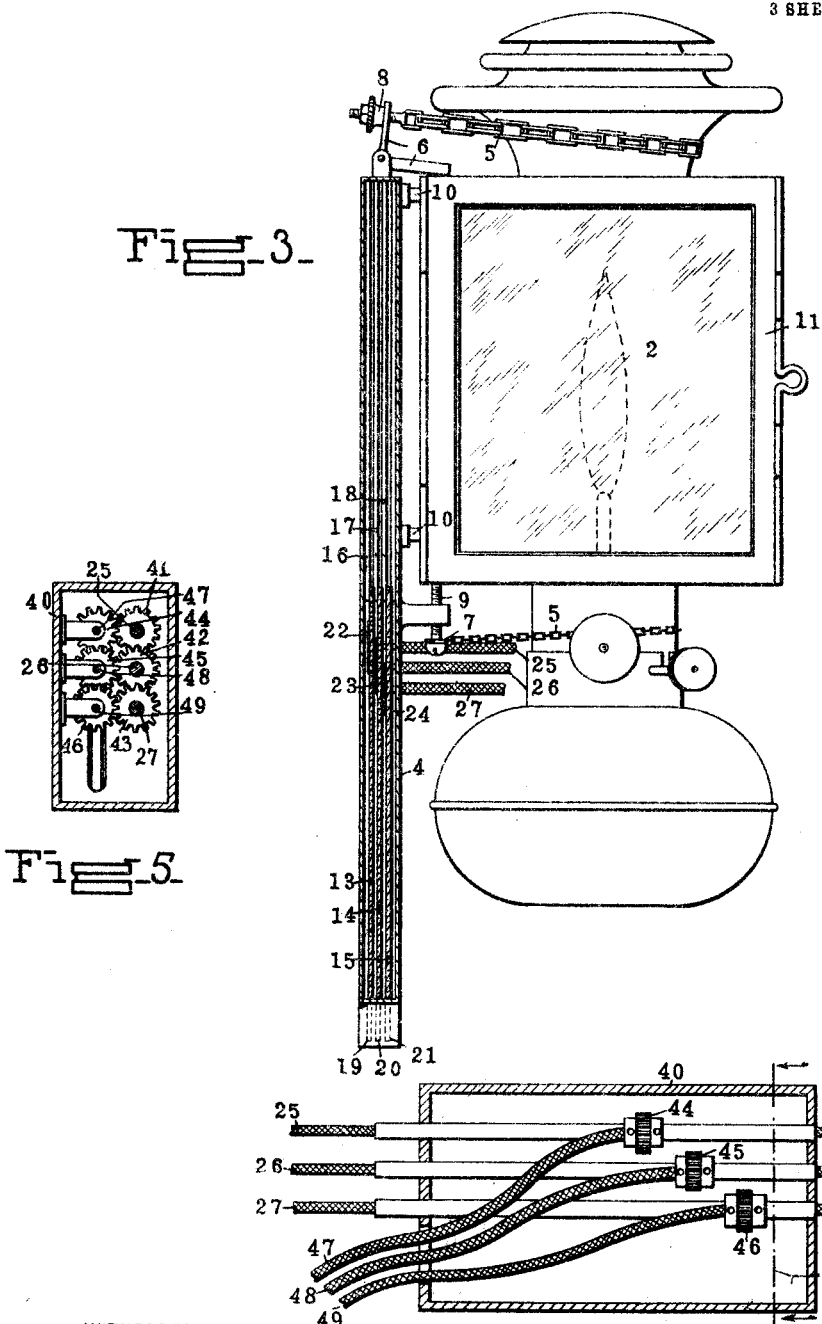

J. W. TOBIN.
VEHICLE SIGNALING APPARATUS.
APPLICATION FILED SEPT. 21, 1909.

1,059,012.

Patented Apr. 15, 1913.
3 SHEETS—SHEET 3.

WITNESSES:

INVENTOR
J. W. Tobin
BY
ATTORNEYS

UNITED STATES PATENT OFFICE.

JOHN W. TOBIN, OF NEW YORK, N. Y.

VEHICLE SIGNALING APPARATUS 1,059,012. Specification of Letters Patent. Patented Apr. 15, 1913.

Application filed September 21, 1909. Serial No. 518,826.

*To all whom it may concern:*

Be it known that I, JOHN W. TOBIN, a citizen of the United States, residing at New York, in the county of New York and State of New York, have invented certain new and useful Improvements in Vehicle Signaling Apparatus, of which the following is a full, clear, and exact description, such as will enable others skilled in the art to which it appertains to make and use the same.

This invention relates to traffic regulating means and more particularly to signaling apparatus for road vehicles.

One of the objects thereof is to provide a practical device of this character adapted to be used with any means for illuminating the roadway upon which the vehicle is traveling by means of which an occupant of the vehicle may notify other persons upon the roadway that he intends to change his course or to stop the vehicle.

Another object is to provide a signaling device of the above general nature which will be positive in its action and which may be controlled with ease.

Other objects are to provide an efficient and practical device that will be inexpensive to manufacture, simple and durable in construction, and so arranged and constructed as to be easily applied to any form of vehicle and attached to the lamps mounted thereon without materially changing or altering the parts.

Other objects will be in part obvious and in part pointed out hereinafter.

Figure 6:
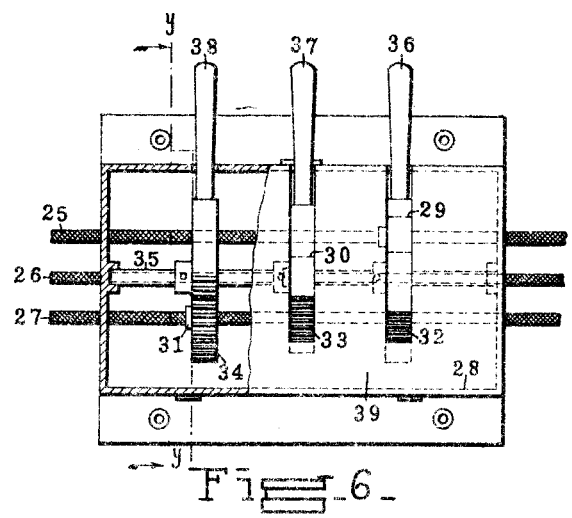
Figure 7:
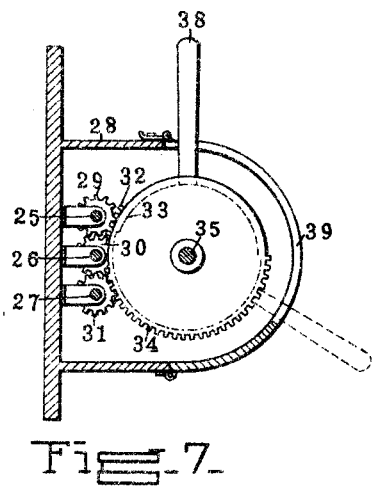

In the accompanying drawings wherein is shown one of the various possible embodiments of the invention, Figure 1 is a diagrammatic view showing the relative positions of the various parts of the apparatus with respect to an automobile body and the sources of light usually carried thereby. Fig. 2 is a front elevation of one of the lamps with a part of the apparatus applied thereto having parts broken away for the sake of clearness. Fig. 3 is a sectional side view taken on the line *x—x* of Fig. 2. Figs. 4 and 5 are a plan and end view respectively, partly in section, of a part of the apparatus hereinafter known as the gear box. Fig. 6 is a plan view with parts broken away of a part of the apparatus hereinafter known as the controlling mechanism. Fig. 7 is a vertical sectional view taken on the line *y—y* of Fig. 6.

Similar reference characters refer to similar parts throughout the several views of the drawings.

As tending to render certain features of this invention more readily and fully understood, it may here be noted that much confusion often arises, especially during the hours of darkness, when the occupants of a vehicle desire to stop or change the course in which they are traveling as to a cross-road, as occupants of other vehicles have no previous warning of such change. This is especially true when vehicles are traveling in the same direction and the one in the lead desires to turn to the right or the left, or to stop, in which case the occupant of the following vehicle received no warning of the change until the vehicle actually begins to turn, and, if following close or traveling at a high rate of speed, the driver thereof may not have time to avoid running into the one ahead. The above and other objectionable features incident to vehicle traffic are obviated by apparatus of the general nature of that hereinafter described.

Referring now to the drawings in detail, 1 indicates a motor vehicle of any suitable construction provided with front lamps 2, 2 and a rear lamp 3. As the main features of the lamp with its complementary signaling means are substantially the same in each instance but one will be described in detail.

Referring particularly to Figs. 2 and 3, in which one of the front lamps is shown, 2 indicates a lamp of any well known design, to the front of which and suspended partially below the same, is attached a casing 4, by means of bands 5, one of which is adjustably secured to the upper end of the casing 4 after passing around the top of the lamp by the upper arms of bell crank levers 6 attached at either side of the casing, and the other is adjustably secured at points 7 (see Fig. 3) around the lower part of the lamp. One of the bands 5 is provided with adjusting means 8, preferably positioned in front of the lamp in order that the strap may be conveniently tightened or adjusted to lamps of different sizes. An adjusting screw 9 holds the casing 4 in relative position. Blocks of rubber or other suitable material 10 are preferably interposed between the casing 4 and the lamp 2 to prevent vibration or rattling of the parts when the car is in motion. The casing 4 is provided with transparent openings both in its front and rear sides and at the upper part thereof, registering with the opening in the front of the lamp 2, through which the light emitted is adapted to pass. The side of the lamps is adapted to be closed by means of a door 11 hinged at one side in the usual manner. The front of the casing 4 is also preferably provided with a door 12 hinged at one side to permit access to the mechanism contained therein. The signaling means within the casing comprises a plurality of transpicuous screens 13, 14 and 15, normally resting in the lower part of the casing and preferably formed of glass and adapted to slide in vertical guide-ways 16, 17 and 18, respectively. These screens are of different colors and denote turns to the "right," "left" and "stop" respectively. Each screen is preferably provided at one side with a rack 19, 20 and 21, respectively, adapted to mesh with pinions 22, 23 and 24 mounted in suitable bearings in an offset portion at one side of the casing. These pinions are adapted to be rotated by means of flexible shafts 25, 26 and 27 which are rotated from the controlling mechanism hereinafter described. Each rack and pinion mechanism is so geared as to move its transpicuous screens from a position below the opening through which the light is emitted from the lamp upwardly to a position to obscure the same, for it will be understood from the foregoing description that when the parts are in their normal or lower position, as shown in Fig. 2, the light emitted through the lens will be white. If now the rack and pinion mechanism is actuated, one of the colored screens will be raised so as to bring the same into the path of light emitted from the source within the lamp, thus warning the people upon the roadway that the occupant of the vehicle desires to change his course or to stop the vehicle, according to which of the colored screens is actuated it being understood, of course that predetermined colors will denote certain movements according to the code of traffic regulation. After the occupant of the vehicle has completed the change in course, the mechanism will again be actuated to restore the screen to normal position. It is obvious, of course, that this mechanism and casing may be inverted or positioned horizontally and accomplish a similar result although the mechanism shown is believed to be more advantageous.

Referring now to Figs. 6 and 7, in which is shown that part of the apparatus known as the "selective controlling mechanism," 28, represents a casing of any suitable form adapted to be secured to the rear of the engine hood or any other convenient part of the vehicle within easy reach of the occupant thereof. Through the rear of the casing pass the flexible shafts 25, 26 and 27, each of which is journaled within suitable bearings and provided with a pinion 29, 30 and 31 adapted to mesh with sectors 32, 33 and 34, respectively. These sectors are preferably loosely mounted upon the same shaft 35 and are provided with operating handles 36, 37 and 38, passing through suitable openings in the top and front of the casing. Each of these sectors is provided with the proper number of teeth adapted to mesh with those of its respective pinion, so as to rotate the latter an amount sufficient to actuate the rack and pinion mechanism within the casing 4 in the manner above described. The same flexible shafts preferably pass entirely through the casing 28 and communicate with the casings 4 attached to both of the front lamps 2 at either side of the vehicle, so that similar signaling screens contained therein are operated simultaneously by one movement of a single operating handle. A door 39 is hinged at the front of the casing to permit access to the mechanism contained therein. Suitable name plates may be applied to the casing near each lever to denote which of the signals it controls.

In order that the intention of the driver to change his course, or stop, may be communicated to an occupant of a following vehicle, a casing similar to that above described is provided adjacent the light emitting opening of the rear lamp 3. This is especially desirable when the car is about to stop. In order that the one movement of the operating handle may be communicated to the signaling means adjacent the rear light, a suitable gear-box 40, Figs. 4 and 5, is provided at one side of the vehicle, through which the above mentioned flexible shafts 25, 26 and 27 pass. On these shafts are mounted pinions 41, 42 and 43 respectively adapted to mesh with pinions 44, 45 and 46, respectively, of similar shape and size, mounted on flexible shafts 47, 48 and 49 leading to the casing adjacent the rear lamp. These last mentioned flexible shafts are adapted to actuate the rack and pinion mechanism for shifting the colored screens in the same manner, as above described, in connection with the casing adjacent the front lamp. It is of course, to be understood that this gearing may be changed in proportion and arrangement of parts, although it is believed that the construction as herein shown is more desirable because of its simplicity and similarity of parts. It will thus be seen that a single movement of the selective controlling mechanism by the operator will actuate the signaling means at each of a plurality of different points on the vehicle.

The operation of the device, which should be largely obvious from the above description, is as follows: Assuming that a blue light is to indicate that the occupant is to turn to the right, a red light that he is to turn to the left and a green light "stop", if the occupant of the vehicle desires to turn to the right, he so manipulates the handle or lever that the blue colored screens in all of the casings adjacent the several lamps will be raised to bring the blue screen into the path of light emitted from the various lamps, thus warning all persons upon the road, whether in front or in the rear of the vehicle, that he intends to turn in that direction, and as he gives this warning a few moments before he makes the turn occupants of other vehicles will have time to prepare themselves to avoid accidents.

The above device, which is entirely mechanical, it will be seen is positive in its action; contains but few movable parts and is not likely to get out of order, and is simple and inexpensive in its construction. Furthermore, it may be applied to any form of motor vehicle having usual and well known makes of lamps now in use without any material change in construction and arrangement of parts, and there will be no diminution in the illumination of the roadway, as the lamps will normally emit a white light during the progress of the vehicle.

The signaling means may be controlled with ease by the person who is operating the car, or, if desired, the controlling mechanism may be placed at some other convenient place, in order that it may be operated by some other occupant of the vehicle. Moreover, the signaling mechanism may be readily applied or removed from any one of the lamps, or, if desired, may be applied to additional lamps by means of the gear-box above described.

While, for the purpose of illustration, red, green and blue screens have been shown and described, it will, of course, be understood that any other color screens could be employed, if so desired, and also that one of the screens could be omitted and the result of the third signal be accomplished by simultaneously moving two of the signals in front of the light at the same time. For instance, if blue and red denoted right and left turns, respectively, the bringing of these screens simultaneously in front of the source of light would produce a green color, which would denote that the vehicle was about to stop. Moreover, many of the advantages of this invention are gained in a construction in which two distinctive signals only, of the above nature are used to indicate merely the direction of turning.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In an apparatus of the class described, in combination, a vehicle, a source of light carried thereby for illuminating the path of travel, comprising an inclosing casing, a plurality of distinctive signaling means associated therewith and normally held in inoperative position, said signaling means being attached outside said inclosing casing, means controlled by an occupant of the vehicle to cause any one of said signaling means to assume an operative position with relation to said source of light, and manually operated means for returning said signaling means relatively remote from said casing to its inoperative position.

2. In an apparatus of the class described, in combination, a vehicle, a source of light carried thereby and adapted to illuminate the path of travel, comprising an inclosing frame, a casing attached outside said frame containing a plurality of distinctive signaling means, said signaling means being slidably mounted within said casing, and manually operated means controlled by an occupant of said vehicle for moving any one of said signals from and to a normally inoperative position with relation to said source of light.

3. In an apparatus of the class described, in combination, a vehicle, a source of light positioned adjacent the front-end thereof, comprising an inclosing frame, a casing attached outside said frame, a plurality of distinctive signals within said casing and normally held in inoperative position, guides within said casing for directing the movement of said signals, and manually operated means controlled by an occupant of the vehicle for moving said signals to and from operative position with relation to said source of light.

4. In an apparatus of the class described, in combination, a vehicle, a source of light carried thereby adjacent the front of said vehicle, a casing detachably secured to said source of light, a plurality of distinctive signals carried by said casing and normally held in inoperative position with relation to said source of light, guides for directing the movement of said signals, a rack and pinion mechanism associated with each of said signals for moving the same to and from operative position, manually operated means adapted to be operated by an occupant of the vehicle for moving said signals, and a flexible connection between said operating means and said casing.

5. In an apparatus of the class described, in combination, a vehicle, a source of light carried thereby, a plurality of normally inoperative distinctive signaling means associated with said source of light, a casing containing said signaling means detachably secured to said source of light and depending in front of and below the same, and manually operated means adapted to be controlled by an occupant of the vehicle for raising said signaling means from inoperative position to a position in front of said source of light.

6. In an apparatus of the class described, in combination, a vehicle, a plurality of sources of light at opposite ends of said vehicle, a casing associated with each of said sources of light, a plurality of distinctive signaling means within each of said casings, a selective controlling mechanism within reach of an occupant of the vehicle, and a flexible connection between said controlling mechanism and each of said casings whereby any one of said signaling means may be brought into operative relation with its respective source of light.

7. In an apparatus of the class described, in combination, a vehicle, a source of light associated therewith, a casing having means for connecting the same with said source of light, a plurality of distinctive signals within said casing, selective controlling mechanism adapted to be operated by an occupant of the vehicle for moving any of said signals into and out of operative relation with said source of light, and means between said controlling mechanism and said casing for transmitting motion from one to the other, said connecting means between the casing and the source of light comprising a band secured to said casing and passing around said source of light.

8. In an apparatus of the class described, in combination, a vehicle, a source of light, a casing containing a plurality of distinctive signaling means detachably secured to said source of light, means connected with said casing adapted to be operated by an occupant of the vehicle for moving any one of said signaling means into and out of operative relation to said source of light, said casing being depended in front of and below said source of light and having a band connected therewith by which the same is detachably secured in position.

9. In an apparatus of the class described, in combination, a vehicle, a source of light, a casing containing a plurality of distinctive signaling means detachably secured to said source of light, means connected with said casing adapted to be actuated by an occupant of the vehicle for moving any of said signaling means into and out of operative relation with said source of light, said casing being depended in front of and below said source of light and having adjustable means connected therewith by which the same is detachably secured in position, and means interposed between the casing and the source of light to prevent vibration of the parts.

10. In an apparatus of the class described comprising, in combination, a vehicle, a plurality of sources of light located at various points thereon, a plurality of distinctive signaling means associated with each of said sources of light, a controlling mechanism for simultaneously moving any of said signaling means into and out of operative relation, intermediate mechanism for transmitting motion from the controlling mechanism to one of said signaling means comprising a flexible shaft, and a second flexible shaft geared thereto and leading to another signaling means.

11. In an apparatus of the class described comprising, in combination, a vehicle, a plurality of sources of light, signaling means associated with each of said sources of light, means adapted to be operated by an occupant of a vehicle for simultaneously actuating said signaling means, a flexible connection interposed directly between one of said sources of light and said controlling means, and a flexible connection between said first-mentioned flexible connection and a second source of light.

12. In an apparatus of the class described, in combination, a vehicle, a plurality of sources of light located at various points thereon, a signaling means associated with each of said sources of light, a selective controlling mechanism adapted to be operated by an occupant of the vehicle, a connection between one of said sources of light and said controlling mechanism, and a flexible connection between said first mentioned connection and a second source of light.

13. In an apparatus of the class described, in combination, a vehicle, a plurality of sources of light located at various points thereon, a signaling means associated with each of said sources of light, a controlling mechanism for simultaneously actuating any of said signaling means, a flexible connection between one of said signaling means and said controlling means, and a second flexible connection between said first mentioned connection and a second signaling means.

14. In an apparatus of the class described, in combination, a vehicle, a plurality of sources of light, a signal associated with each of said sources of light, means for actuating said signals from a point remote therefrom and flexibly connected with one of said sources of light, a gear-box, a second flexible connection connecting a second source of light and actuated from said first flexible connection within said gear-box.

15. In an apparatus of the class described in combination, a vehicle, a source of light thereon, a signal associated with said source of light, a controlling mechanism adapted to be actuated by an occupant of the vehicle for moving said signal into operative position with said source of light, and a shaft between said signal and said controlling mechanism, said controlling mechanism including a gear on said shaft, and means meshing with said gear for rotating said shaft to move the signal.

16. In an apparatus of the class described, in combination, a vehicle, a source of light, a plurality of distinctive signaling means associated therewith, a controlling mechanism, and a shaft between each of said signaling means and said controlling mechanism, said controlling mechanism including a gear on each of said shafts, and means meshing with each of said gears for rotating the shafts whereby the signals are moved into operative relation with said source of light.

17. In an apparatus of the class described, in combination, a vehicle, a source of light, a casing detachably secured to said source of light, a plurality of distinctive signaling means within said casing, a rack and pinion mechanism associated with each of said signaling means, a selective controlling mechanism adapted to be operated by an occupant of the car including a shaft between said pinion and said controlling mechanism, a gear on said shaft, and means for rotating said gear and shaft whereby the rack and pinion mechanism are actuated to move the signal to and from operative position.

18. In an apparatus of the class described, in combination, a vehicle, a source of light, a plurality of distinctive signaling means associated therewith, mechanism for moving each of said signaling means into and out of operative position, a selective controlling mechanism for actuating said first mentioned mechanism including a flexible connection between said controlling mechanism and said actuating mechanism, a gear on said connection, and a sector meshing with said gear for rotating the same.

19. In an apparatus of the class described, in combination, a vehicle, a plurality of sources of light, a plurality of distinctive means associated with each of said sources of light, a selective controlling mechanism for operating a plurality of signals simultaneously, said controlling mechanism including a shaft between each of said signaling means and said controlling mechanism, a gear on each of said shafts, and means for rotating each of said gears a predetermined amount.

20. In an apparatus of the class described, in combination, a vehicle, a plurality of sources of light located on various points thereon, a plurality of distinctive signaling means associated with each of said sources of light, a controlling mechanism therefor including a flexible connection between each of said signals and said controlling mechanism, a gear on each of said flexible connections, and sectors meshing with each of said gears for rotating the same a predetermined amount to move the signals into or out of operative position.

21. In an apparatus of the class described, in combination, a vehicle, a front and rear light, a signal associated with each of said lights, a controlling mechanism for said signals including a flexible connection between one of said signals and the said controlling mechanism, a second flexible connection operated from said first connection and connected with the other of said signals, and a sector for rotating said first flexible connection a predetermined amount whereby both signals are moved simultaneously to and from operative position.

22. In an apparatus of the class described, in combination, a vehicle, a plurality of sources of light associated therewith at opposite ends thereof, a casing detachably secured to the exterior of each of said sources of light, a plurality of distinctive signaling means within each of said casings, a selective controlling mechanism adapted to be operated by an occupant of the vehicle for simultaneously moving a plurality of similar signaling means to and from operative relation with their respective sources of light, and a flexible connection between said selective controlling mechanism and each of said casings whereby the signals are operated simultaneously.

In testimony whereof I affix my signature, in the presence of two witnesses.

JOHN W. TOBIN.

Witnesses:
 PAUL A. BLAIR,
 HELEN M. SEAMANS.